(12) United States Patent
Gualtieri

(10) Patent No.: US 6,505,509 B2
(45) Date of Patent: Jan. 14, 2003

(54) APPARATUS AND METHOD FOR MEASURING THE LEVEL OF A FLUID

(75) Inventor: Devlin M. Gualtieri, Ledgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/800,548

(22) Filed: Mar. 7, 2001

(65) Prior Publication Data

US 2001/0035048 A1 Nov. 1, 2001

Related U.S. Application Data

(60) Provisional application No. 60/187,600, filed on Mar. 7, 2000.

(51) Int. Cl.[7] .......................... G01F 23/00; G01F 25/00; G01M 1/14; G01S 15/00; G01V 3/00
(52) U.S. Cl. ..................... 73/290 V; 73/290 R; 73/1.73; 73/1.83; 367/95; 324/323; 181/124
(58) Field of Search .......................... 73/290 R, 290 V, 73/1.73, 1.83, 549; 340/621; 367/87, 95, 189; 324/323, 601, 76.11, 92; 181/124

(56) References Cited

U.S. PATENT DOCUMENTS

| 3,944,994 A | | 3/1976 | Fanshawe .................... 340/244 |
| 3,970,973 A | * | 7/1976 | Lazzaro ........................ 333/97 |
| 4,170,135 A | * | 10/1979 | Booman et al. .......... 73/290 R |
| 4,589,281 A | | 5/1986 | Aldrich ..................... 73/290 R |
| 4,729,129 A | * | 3/1988 | Koerner ...................... 455/117 |
| 4,729,245 A | * | 3/1988 | Hansman, Jr. ............... 73/865 |
| 5,249,463 A | | 10/1993 | Willson et al. ............... 73/290 |
| 5,252,929 A | * | 10/1993 | Taroumaru ................... 330/129 |
| 5,994,905 A | * | 11/1999 | Franchville ................. 324/533 |
| 6,005,891 A | * | 12/1999 | Chadwick et al. .......... 375/224 |

* cited by examiner

*Primary Examiner*—Hezron Williams
*Assistant Examiner*—Katina Wilson

(57) ABSTRACT

An apparatus for detecting a fluid level is disclosed, which includes a coaxial sensor having a pair of conducting tubes positioned with respect to each other in spaced coaxial arrangement, a coaxial transmission line connected to the sensor, a means for injecting a standing wave into the coaxial sensor, a summer for summing the injected wave and a reflected wave connected to the sensor, a means for adjusting the frequency of the injected wave in response to the voltage and phase of the summed signal, and a processor for processing and displaying the frequency as a representation of the level of the fluid. A method for detecting the fluid level is also disclosed.

27 Claims, 16 Drawing Sheets

APPARATUS AND METHOD FOR MEASURING THE LEVEL OF A FLUID

Related Application

This application claims priority from U.S. Provisional Patent Application Ser. No. 60/187,600 entitled, "Fluid Level Sensor, filed on Mar. 7, 2000. The contents of U.S. Provisional Patent Application Ser. No. 60/187,600 are fully incorporated herein by reference.

BACKGROUND OF THE INVENTION

1. Field of the Invention

The present invention relates generally to an apparatus and method for measuring the level of a fluid. More particularly, the present invention utilizes standing wave reflectivity of a coaxial transmission line to determine the level of a fluid in which the coaxial transmission line is immersed.

2. Description of the Related Art

There are many ways to measure the level of a fluid, and the techniques are numerous since fluids have many physical properties that can be exploited. These properties include the temperature, weight, capacitance, density, resistance, etc., of the fluid.

Examples of various techniques and devices include thermal fluid level sensors. Fluids have a heat capacity and thermal conductivity that is different from air. Small heating elements will have different temperatures whether they are in, or out, of the fluid. Another method uses capacitance to measure the level of the fluid. Since the dielectric constant of a fluid is different than that of air, capacitor plates having an intervening fluid will have a larger capacitance. Resistive and eddy current techniques have also been utilized. Since some fluids are electrically conducting, electrodes will carry current when immersed in a fluid. Eddy current losses for a coil will be higher when the coil is immersed in a conductive liquid.

Magnetostrictive techniques are also popular. This technique uses a combined magnetic and ultrasonic effect. It is possible to magnetically generate twist pulses in a wire (the Wiedemann Effect), which propagate at the speed of sound in the material and are reflected at the point at which the wire enters the liquid. The time of flight is used to measure the fluid level. Fiber optic technology is also utilized. The index of refraction difference between a glass fiber and the fluid can be used to optically detect the fluid level. Ultrasonic ranging is yet another method readily available. Since the time of flight of an ultrasonic pulse differs while propagating either in the fluid or in air, the difference can be used to detect fluid level. Ultrasonic damping has also been exploited. Acoustically resonant elements (e.g., ultrasonic transducers) will be damped by a fluid, that is, it will take more energy to excite them at a given amplitude. The time of flight of a radar pulse is also used to detect the surface of the fluid. This is usually not useful for small containers, although micropower impulse radar (MIR) will work at short range. Finally, a pressure sensor at the bottom of a container will gauge the weight of the fluid above it.

Though each of these techniques and sensors has a specific use, no one device or method provides an accurate fluid level measurement suitable for various applications.

SUMMARY OF THE INVENTION

It is therefore an aspect of the present invention to provide an apparatus and method for measuring the level of a fluid. The preferred embodiment of the present invention incorporates a novel approach using frequency domain analysis (FDA) of standing wave resonance (SWR) in a coaxial transmission line. It is based on the principle that the speed of light is slower in a fluid than in air. The sensor is applicable to level sensing for a wide variety of fluids, including oil and water. The sensor also functions in very harsh fluids (e.g., acids) with a proper choice of materials.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

A preferred embodiment of the present invention will be described herein below with reference to the accompanying drawings.

In attempting to solve the longstanding sensor problems time domain reflectometry (TDR) was experimented with as a sending method in a coaxial type sensor. The reflected signals from transmission lines of various lengths driven by a 10 MHz square wave oscillator with a small rise-time were tested. The transmission lines were terminated with a 150-pF capacitor to simulate the transition to a fluid surface. Although the transit times of the reflected signals correspond to the lengths of the transmission lines, the transit times are short (nanosecond range) and hard to measure.

Figure 1:
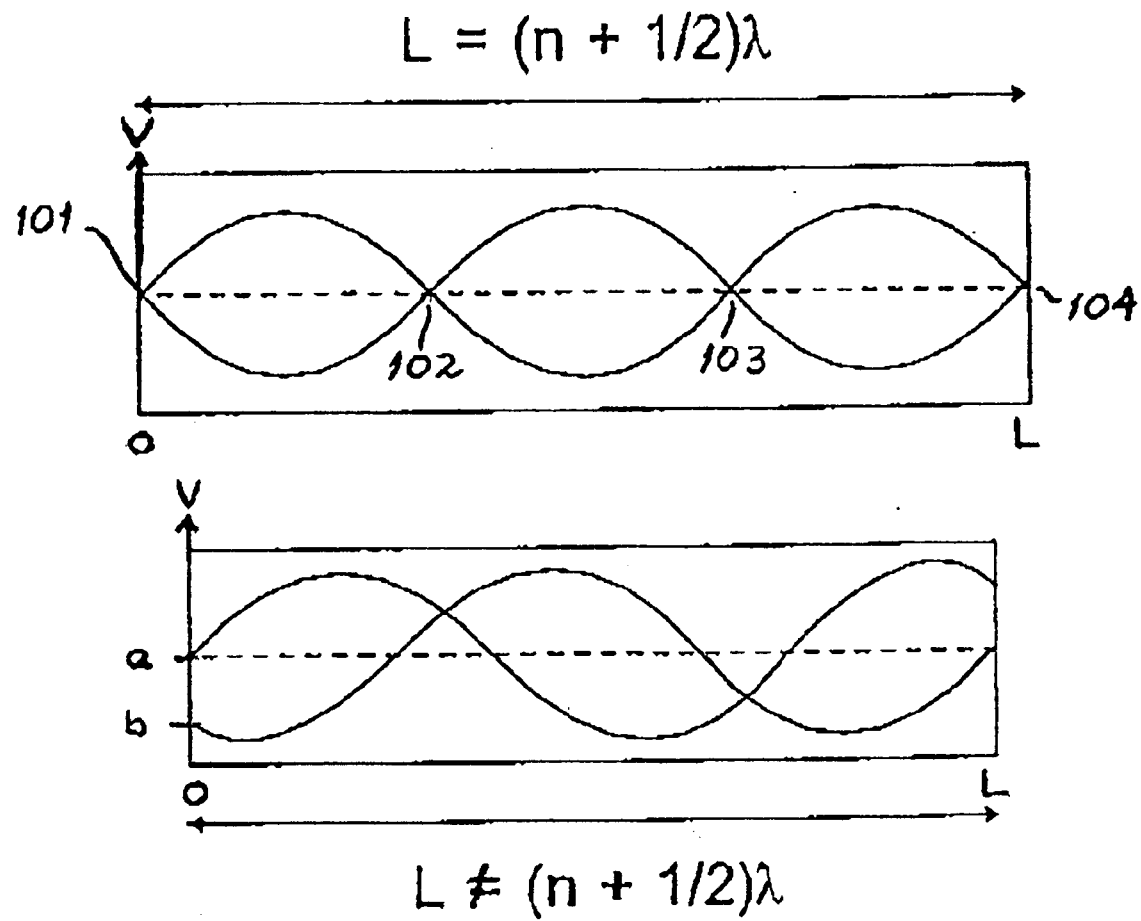
FIG. 1 is a diagram of reflected waves in a transmission line.

As an alternative to TDR, an investigation into standing wave reflectance in the frequency domain in transmission lines was explored. FIG. 1 shows reflected waves in a transmission line. The upper graph depicts an injected and reflected wave pattern satisfying the following equation:

$$L=(n+\tfrac{1}{2})\lambda \quad \text{Eq. 1}$$

where L is the length of the transmission line, $\lambda$ is the wavelength of the injected wave, and n is a whole integer from 0 to $\infty$. When the length of the transmission line is an $n+\tfrac{1}{2}$ multiple of the wavelength, there is destructive interference and the signal strength is a minimum (a node). Four nodes 101, 102, 103 and 104 are shown in FIG. 1. As the length varies from this condition, as shown in the lower graph of FIG. 1, the interference condition is not met, and there is a net voltage at the driven end, i.e. the difference between points a and b. In the fluid level sensor, the physical length of the transmission line is held constant, but the level of the fluid changes the effective electrical length.

Figure 2:
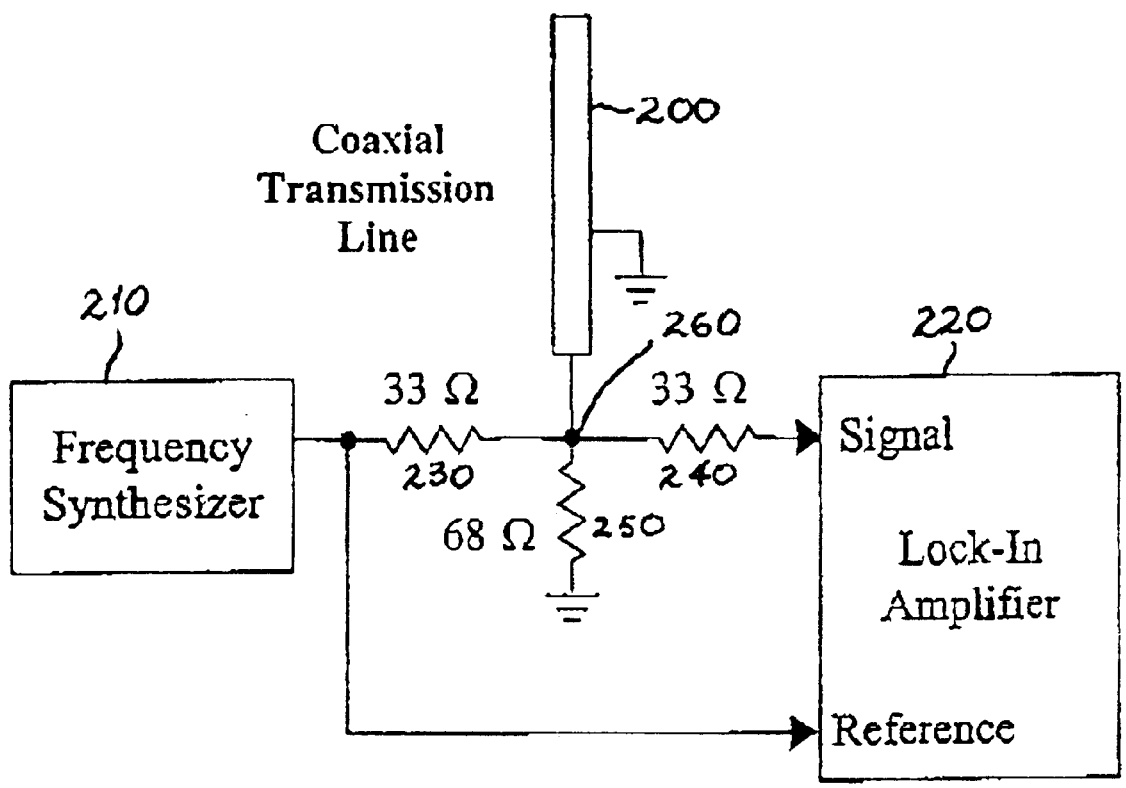
FIG. 2 is a block diagram of an apparatus to measure standing wave voltage in a transmission line in the frequency domain.

FIG. 2 shows an apparatus to measure the standing wave voltage in a coaxial transmission line in the frequency domain. A frequency synthesizer 210 inputs or injects a sine wave signal into the transmission line at input point 260. The signal is reflected at the end of the transmission line 200 back to the input point 260. The resistor "T" network, comprised of resistors 230, 240 and 250, sums the injected and reflected waves at the input point 260 of the transmission line 200. A lock-in amplifier 220 measures the voltage difference between the injected wave and the reflected wave at the input 260 of the transmission line 200. Although the far end of the transmission line is shown here as open, a termination in any impedance other than the characteristic impedance of the transmission line will also reflect the signal. If Eq. 1 is satisfied the voltage difference will be nearly zero; if not, a substantial voltage will be detected that is relative to the length of the transmission line 200.

Figure 3:
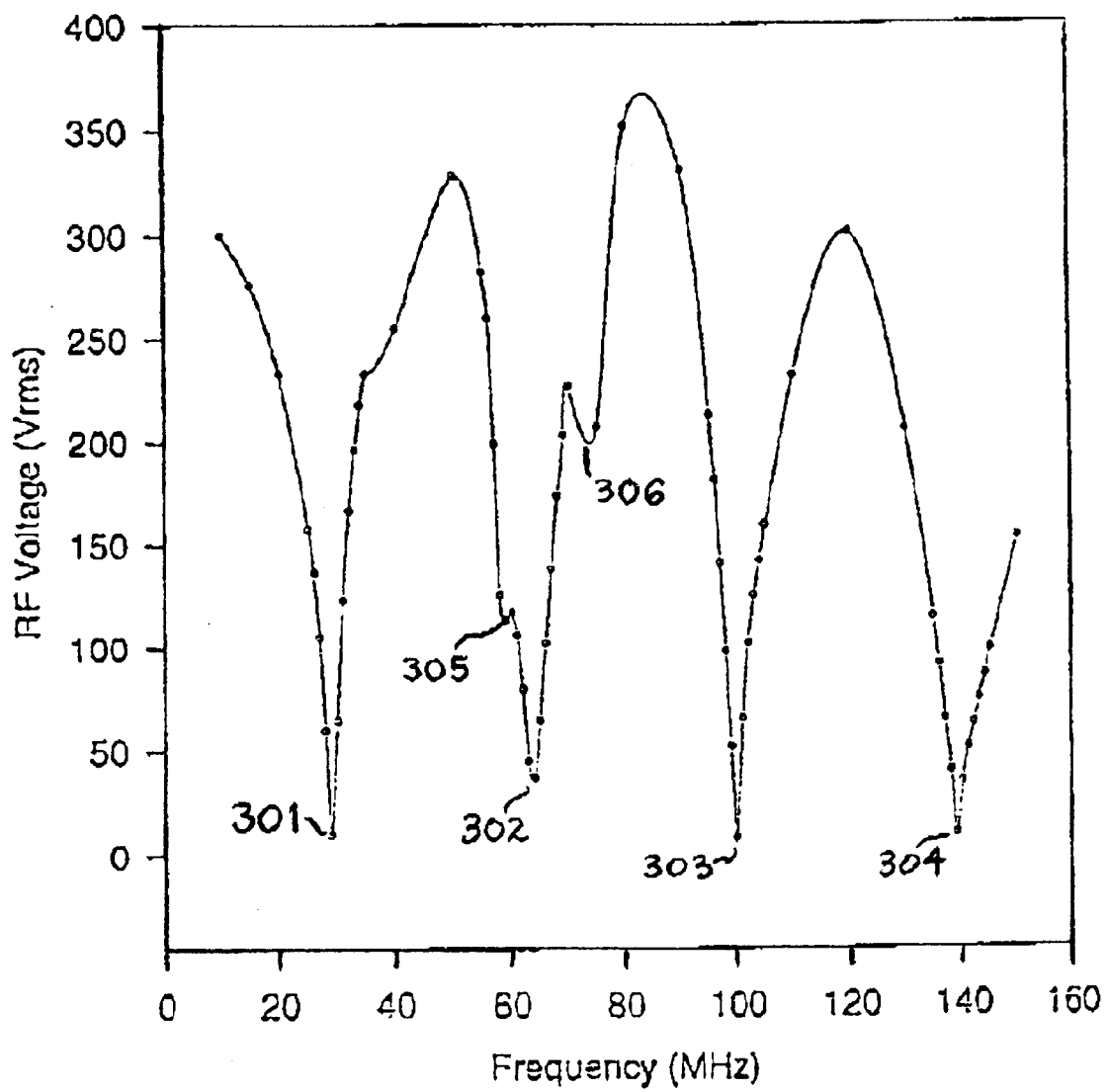
FIG. 3 is a graph of the standing wave response of a 90-inch length of 50-ohm coaxial cable in the frequency domain.

FIG. 3 shows the standing wave response of a 90-inch length of 50-ohm coaxial cable in the frequency domain using the apparatus of FIG. 2. In this case, a first node 301 appears at slightly less than 30 MHz, with other nodes 302, 303 and 304 at regular intervals. Also apparent are minor stray voltages 305 and 306 caused by impedance discontinuities in the measuring system (e.g., the impedance of the "T" network not exactly matching the transmission line impedance).

Therefore, as shown in the prior art, when Eq. 1 is satisfied the sum of the voltage of the injected wave and the voltage of the reflected wave measured at the input of the transmission line will nearly equal zero. When the length of the transmission line varies, and in the event Eq. 1 is not satisfied, a voltage at the input of the transmission line will be produced.

Figure 4:
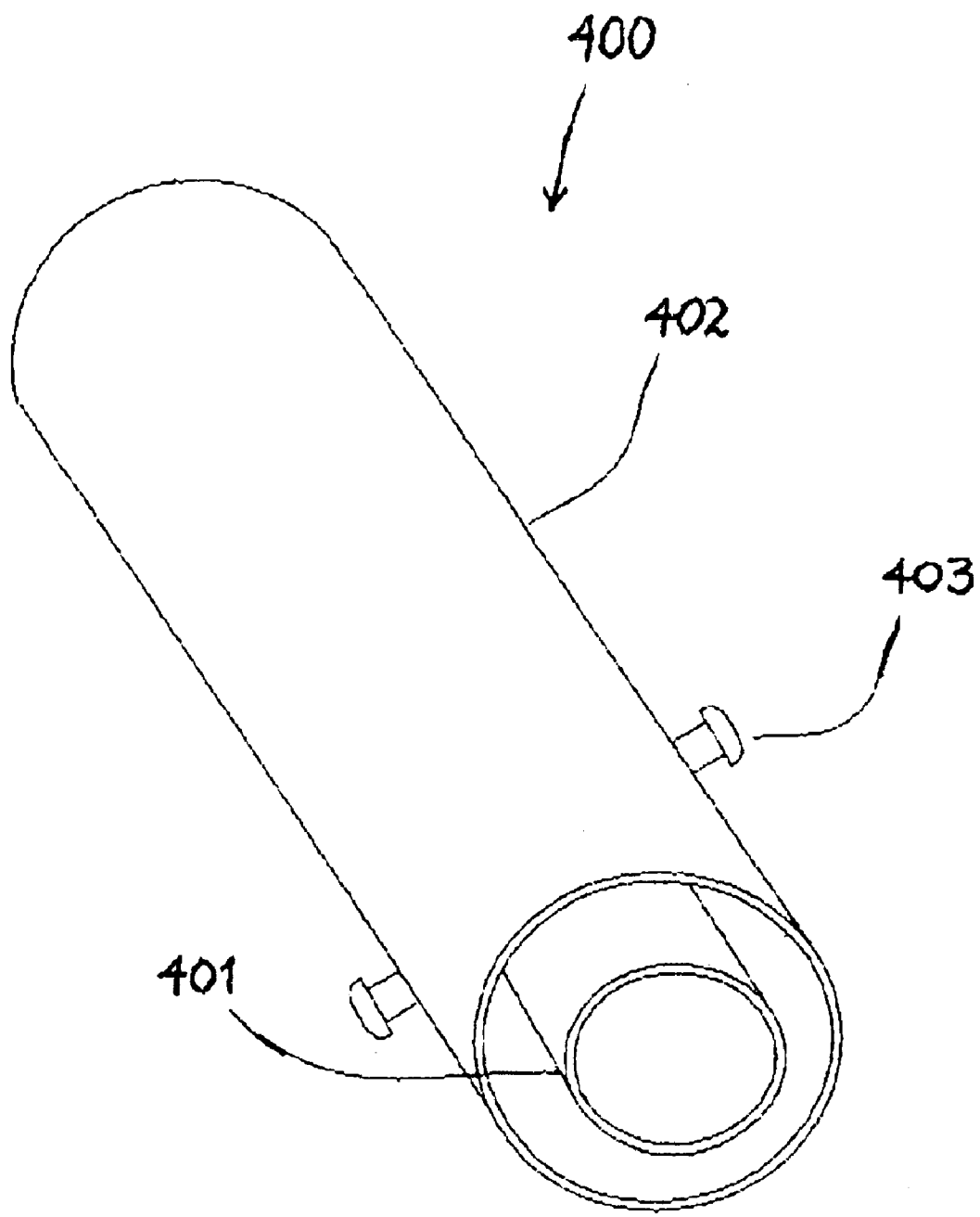
FIG. 4 is a perspective view of a fluid level sensor constructed according to an embodiment of the present invention.

FIG. 4 depicts a fluid level sensor constructed according to an embodiment of the present invention. The coaxial sensor 400 is constructed from commonly available copper pipes arranged as an air dielectric coaxial transmission line having an impedance of 29 ohms. The coaxial sensor 400 is made from a 12-inch length of 16 mm outside diameter (O.D.) inner tubing 401 inside a 12-inch length coaxial outer tube 402 of 26 mm inside diameter (I.D.). In the preferred embodiment of the present invention, the length of the inner tube 401 is equal to the length of the outer tube 402. Nylon bolts 403 pass through outer tube 402 and serve to hold the inner tube 401 in place. Nylon was chosen for its insulating properties. Though not shown in FIG. 4, outer tube 402 is electrically connected to ground and inner tube 401 is electrically connected to an inner conductor of a coaxial cable. When fluid enters into the coaxial sensor between the outer tube 402 and the inner tube 401, the fluid decreases the effective length of the overall sensing element (i.e. the coaxial sensor 400 and the connected coaxial cable) of the fluid level sensor and as a result the standing wave voltage will change. The length of the coaxial cable is important, since the cable is part of the resonant transmission line and is factored in during the calculation of Eq. 1.

Figure 5:
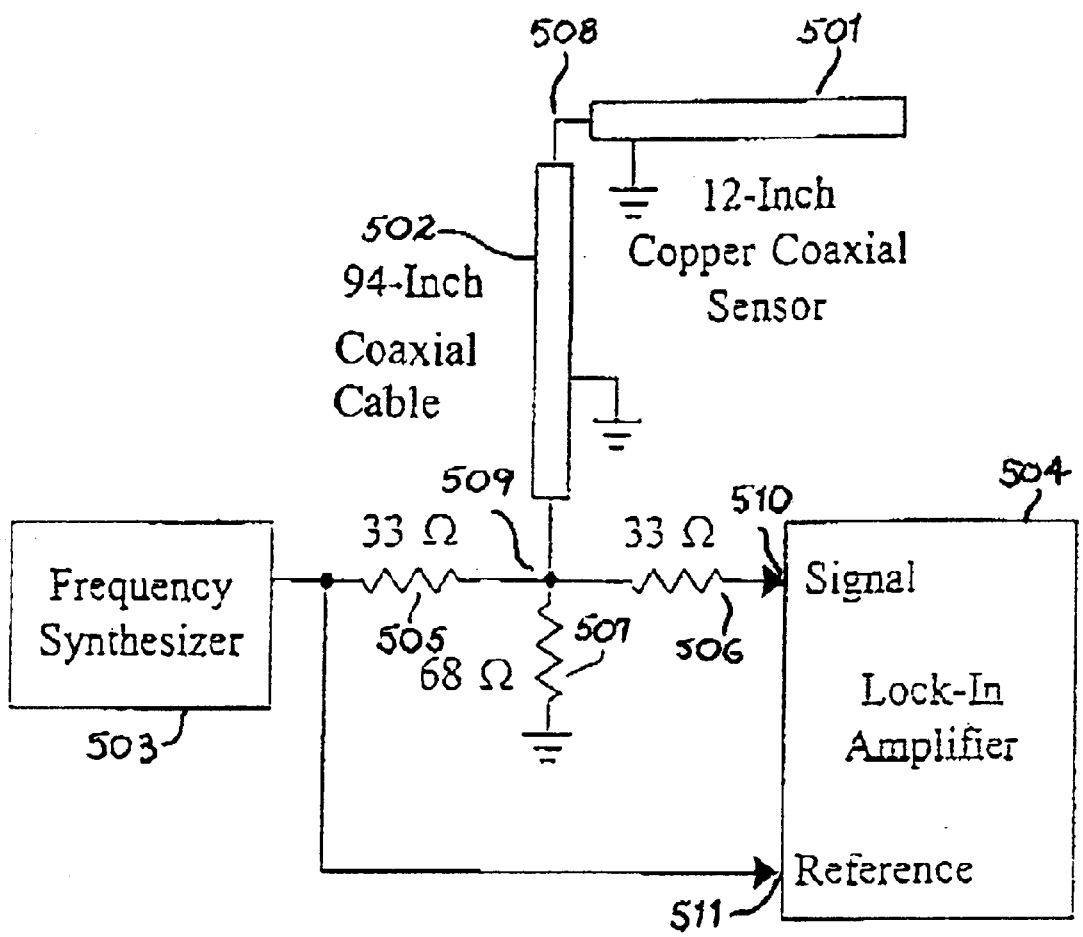
FIG. 5 is a block diagram of an apparatus used to measure standing wave voltage according to an embodiment of the present invention.

FIG. 5 depicts the apparatus according to the preferred embodiment of the present invention used to measure the standing wave voltage. Shown in FIG. 5 are a 12-inch copper coaxial sensor 501 whose outer tube is shown connected to ground, a 94-inch coaxial cable 502 whose inner conductor 508 is shown connected to the inner tube of the coaxial sensor 501, a resistor "T" network (comprised of resistors 505, 506, and 507), a frequency synthesizer 503, and a lock-in amplifier 504. The frequency synthesizer 503 is used to inject a sine wave into the coaxial cable 502 and the coaxial sensor 501 (the combination of which will hereinafter be referred to as the "sensing element") at the input 509 of the sensing element. The injected wave reflects back from the end of the sensing element, where the resistor "T" network adds the voltage of the injected wave to the voltage of the reflected wave, the sum of which is input into signal port 510 on the lock-in amplifier 504. The initial injected wave is also sent to a reference port 511 on the lock-in amplifier to serve as a calibration reference.

Figure 6:
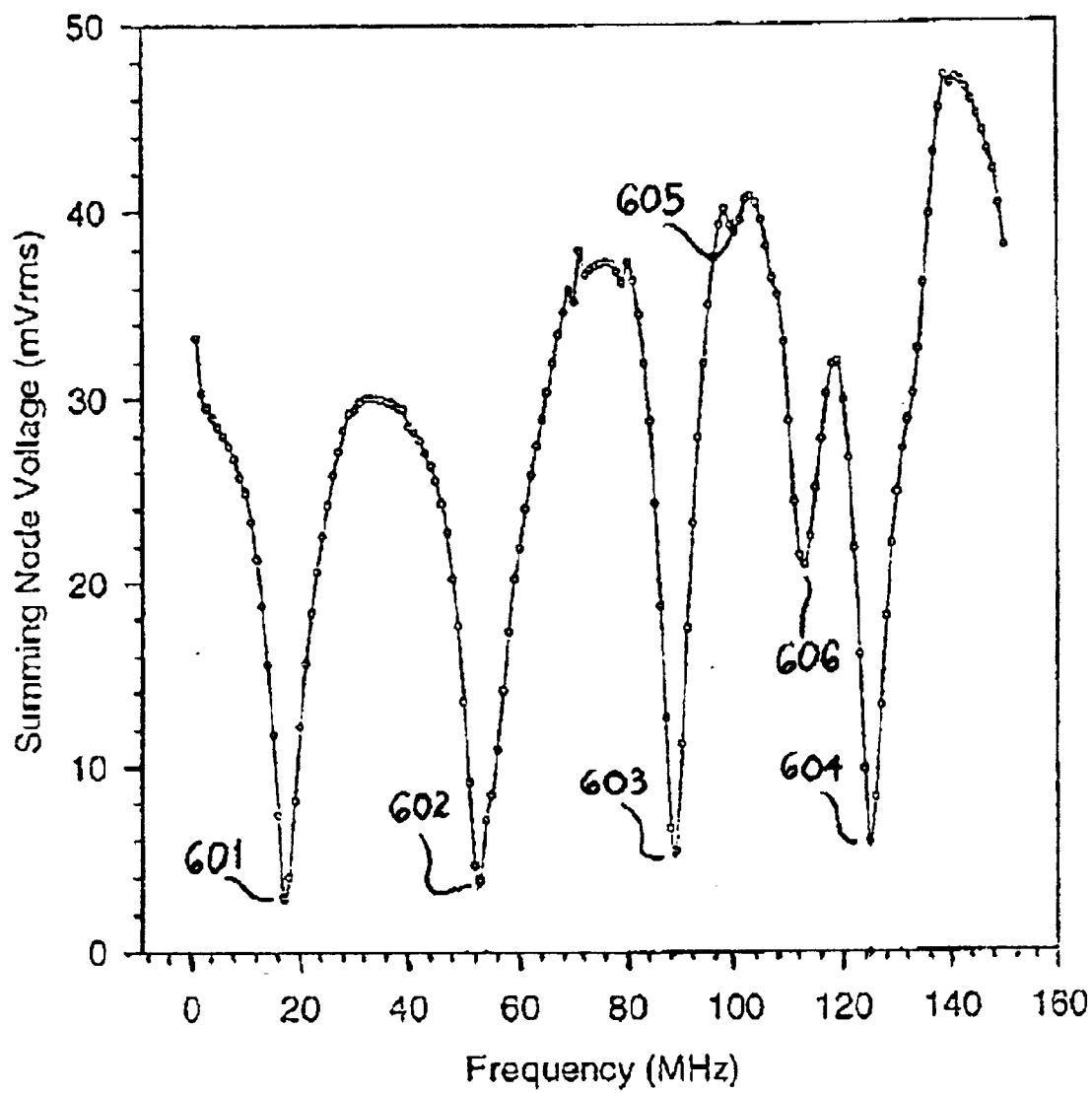
FIG. 6 is a graph of the frequency domain standing wave spectrum of the fluid level sensor of FIG. 5.

FIG. 6 shows the frequency domain standing wave spectrum of the coaxial fluid level sensor of FIG. 5 when tested with standard pump oil. There is a clear first node 601 at about 17 MHz with subsequent nodes 602, 603, and 604 at regular intervals graphically illustrating the satisfying of Eq. 1. The calculated impedance of this coaxial sensor is 29-ohms. The impedance of the coaxial cable is 50-ohms. Even with such a mismatch there are deep standing wave nulls arising from reflections in the total 106-inch length (i.e. 94-inch coaxial cable 502 plus the 12-inch coaxial sensor 501). The RF amplitude at the input 509 of the sensing element in the embodiment shown in FIG. 5 averages about 40-millivolt rms. Smaller input signals in the microvolt levels can be used as the injected wave, and amplifiers and filters incorporated into the lock-in amplifier are utilized to detect and measure the microvolt levels.

Figure 7:
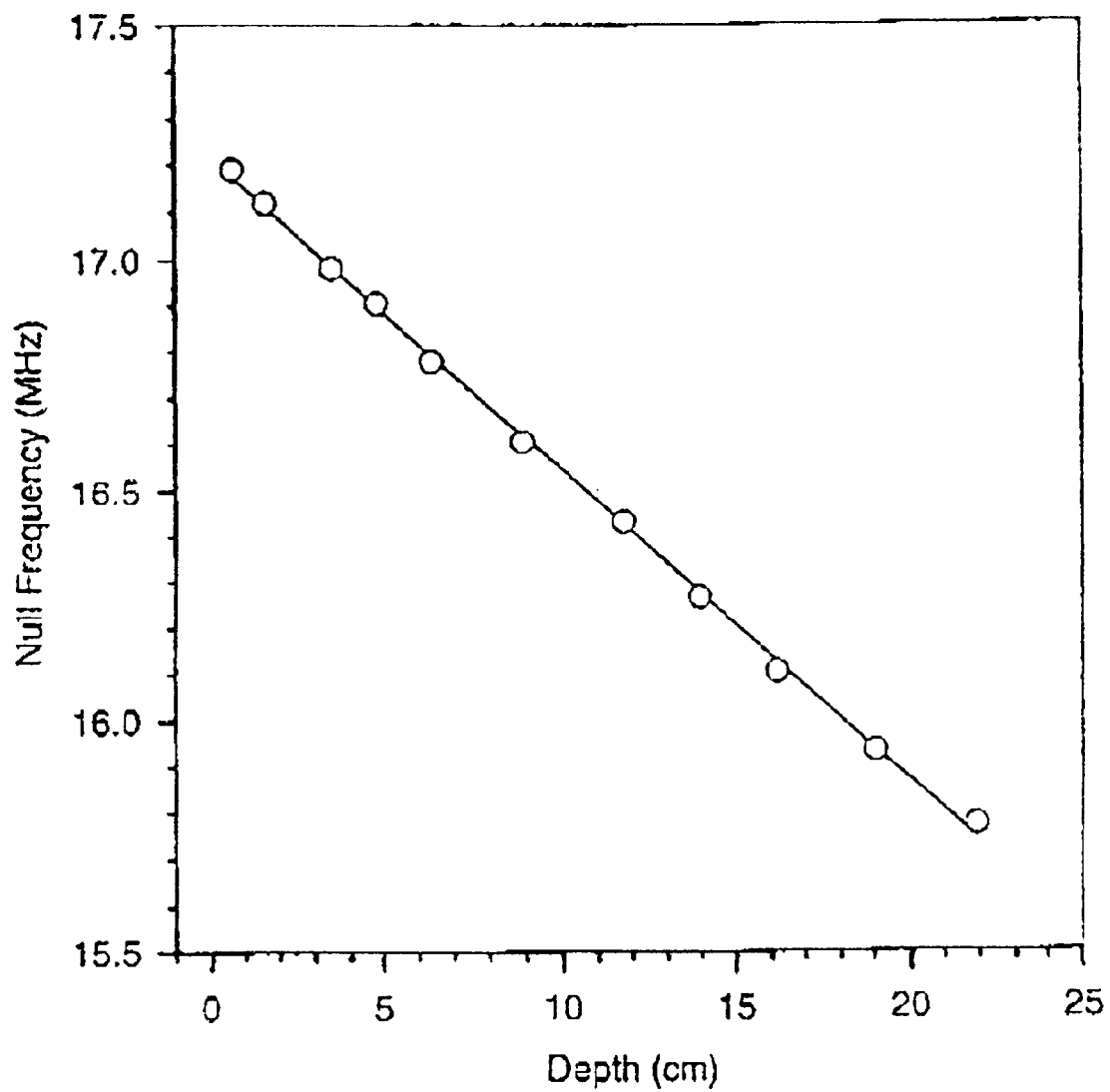
FIG. 7 is a graph of the frequency shift of a first node of the sensor versus a level of pump oil in the sensor.

FIG. 7 shows the frequency shift of the first node 601 of FIG. 6 of the fluid level sensor versus the level of pump oil in the sensor. A nearly linear decrease in the node frequency with fluid depth is shown, and is calculated at about 67 kHz per cm of fluid.

In accordance with the present invention, both standard pump oil and Skydrol® hydraulic fluid were utilized. Skydrol® is an aviation hydraulic fluid with excellent hydraulic properties, but it is a caustic liquid, and this limits the type of materials from which a sensor can be constructed. A substantial compatibility guide for Skydrol® can be found at <http://www.skydrol.com/compat.htm>. Since the materials of a copper coaxial sensor, as used to measure the level of pump oil, are not compatible with Skydrol® hydraulic fluid, in a second embodiment of the present invention the inner and outer tubes of a 36-inch length sensor are constructed from aluminum and Teflon, which are both Skydrol® compatible.

The impedance of an air dielectric coaxial transmission line is given by the following equation:

$$Z = 138 \log_{10}(b/a) \qquad \text{Eq. 2}$$

where "Z" is the impedance in ohms, "b" is the inside diameter (I.D.) of the outer conductor, and "a" is the outside diameter (O.D.) of the inner conductor. By matching the impedances of the coaxial sensor and the coaxial cable the stray voltages (e.g. 605 and 606 as shown in FIG. 6) are reduced to a minimum, thus ensuring proper nodal detection.

Table 1 is a sensor impedance chart with the inside diameter (I.D.) of the outer conductor (in inches) across the top, and the outside diameter (O.D.) of the inner conductor (in inches) on the left side. As shown in Table 1, choosing a 0.759-inch I.D. outer conductor and 0.3125-inch O.D. inner conductor results in a 53.2-ohm impedance, close to the desired 50-ohm impedance of the coaxial cable.

TABLE 1

| | I.D. | | | | |
|---|---|---|---|---|---|
| O.D. | 1.25 | 0.902 | 0.759 | 0.652 | 0.527 |
| 0.75 | 30.6 | 11.1 | 0.7 | | |
| 0.625 | 41.5 | 22.0 | 11.6 | 2.5 | |
| 0.375 | 72.2 | 52.6 | 42.3 | 33.1 | 20.4 |
| 0.3125 | 83.1 | 63.5 | 53.2 | 44.1 | 31.3 |
| 0.25 | 96.5 | 76.9 | 66.6 | 57.5 | 44.7 |
| 0.1875 | 113.7 | 94.1 | 83.8 | 74.7 | 61.9 |

Figure 8:
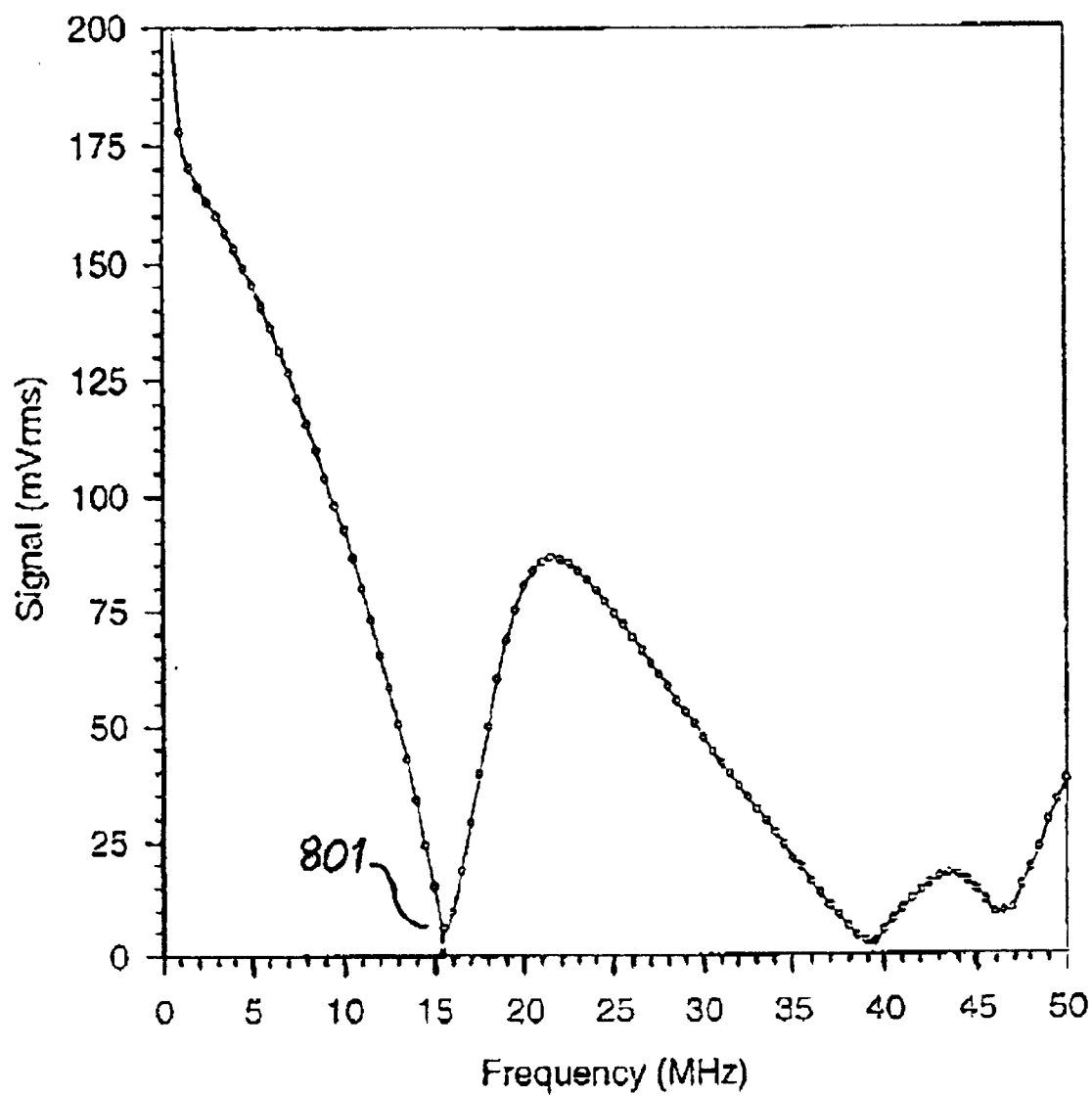
FIG. 8 is a graph of the frequency domain standing wave spectrum of a 36-inch fluid level sensor coupled by a 90-inch length of 50-ohm coaxial cable.

According to the second embodiment of the present invention, the 36-inch coaxial sensor of 53.2-ohms impedance is electrically connected to a 90-inch length of coaxial cable, producing a sensing element of 126 inches. FIG. 8 shows the frequency domain standing wave spectrum of this embodiment. There is a clear first node 801 at about 15 MHz that is easily detected by the amplifier.

Figure 9:
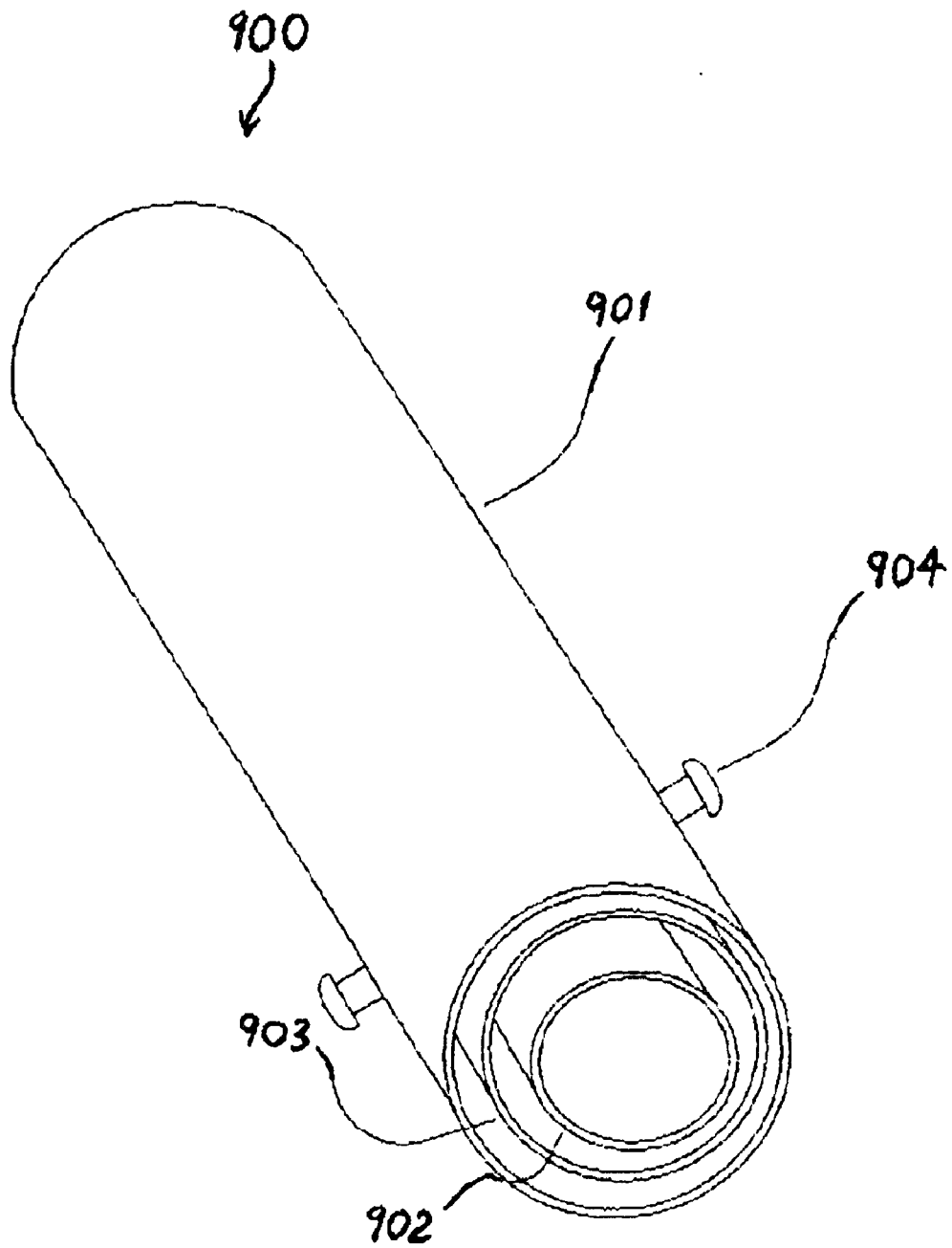
FIG. 9 is a perspective view detailing the fluid level sensor according to one embodiment of the present invention.

As stated above with reference to FIG. 7, the response of the 12-inch copper tubing sensor to pump oil was about 67 kHz/cm. Utilizing the 36-inch sensor with Skydrol®, the response is nearly an order of magnitude higher. This is the result of the much lower speed of light in this high dielectric liquid. By adjusting to allow less of the fluid into the coaxial sensor, i.e. by using a glass tube over the inner conductor to prevent the Skydrol® from filling the entire inner space, the sensitivity of the sensor is reduced. According to a third embodiment of the present invention, FIG. 9 shows the Skydrol® fluid level sensor 900 having an outer aluminum cylinder 901, an inner aluminum conductor 902 partitioned by a glass tube 903, and nylon spacers 904. To linearize the sensor, the inner glass tube has a variable cross-section that adjusts fluid volume along the length of the sensor.

It is also possible to modify the present invention such that the sensitivity may be increased so that smaller sensors can be used to monitor smaller volumes. In another embodiment of the present invention, the inner conductor is formed as an inductor by winding it as a helical coil to increase the electrical length of a transmission line. Forming this coil on a magnetic core such as ferrite further increases the coil inductance and the delay. The delay is actually an increase in the time required for the injected wave to reflect and return due to the increased transmission length of the sensing element.

Figure 10:
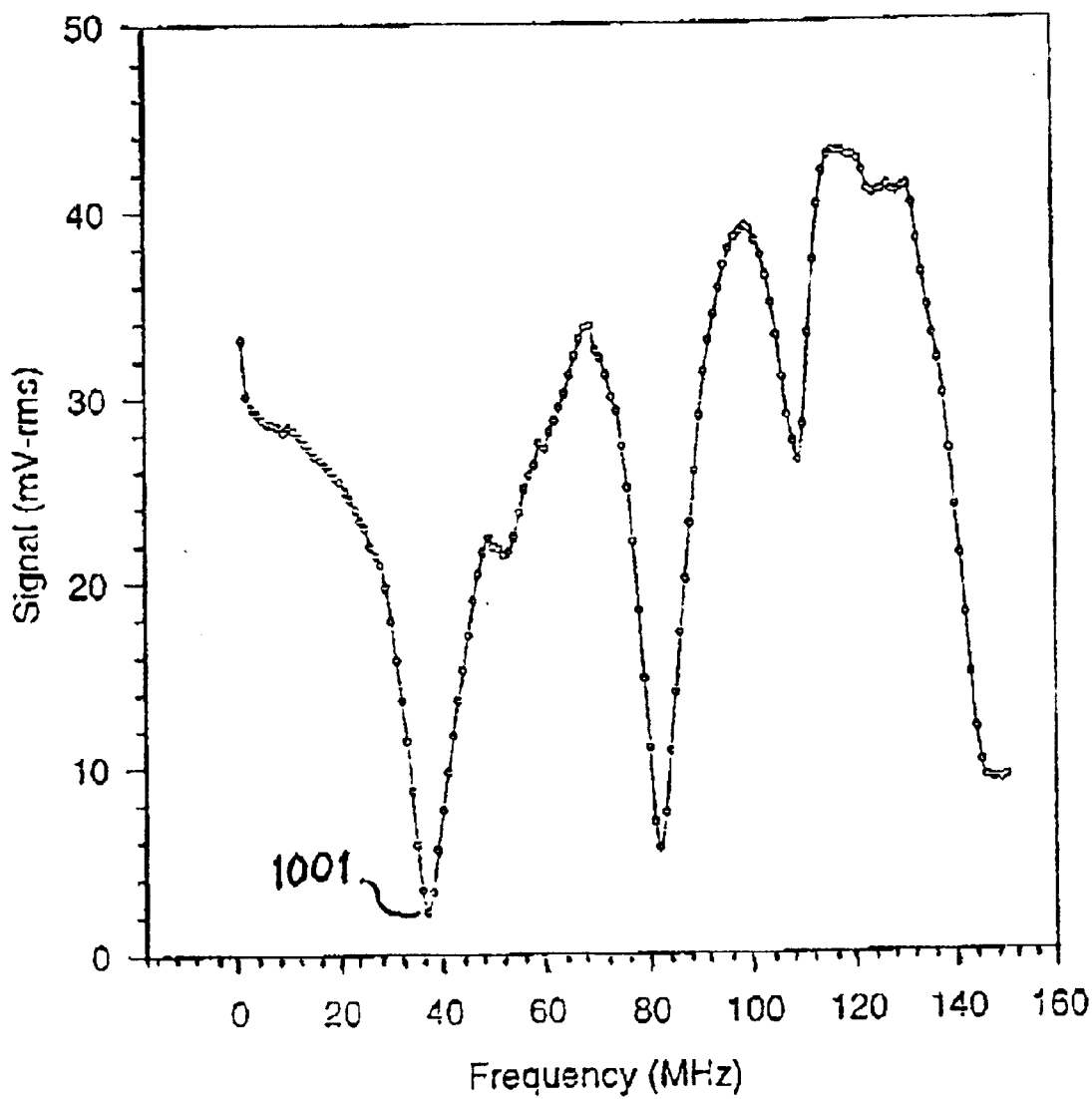
FIG. 10 is a graph of the frequency response of a delay line sensor.
Figure 11:
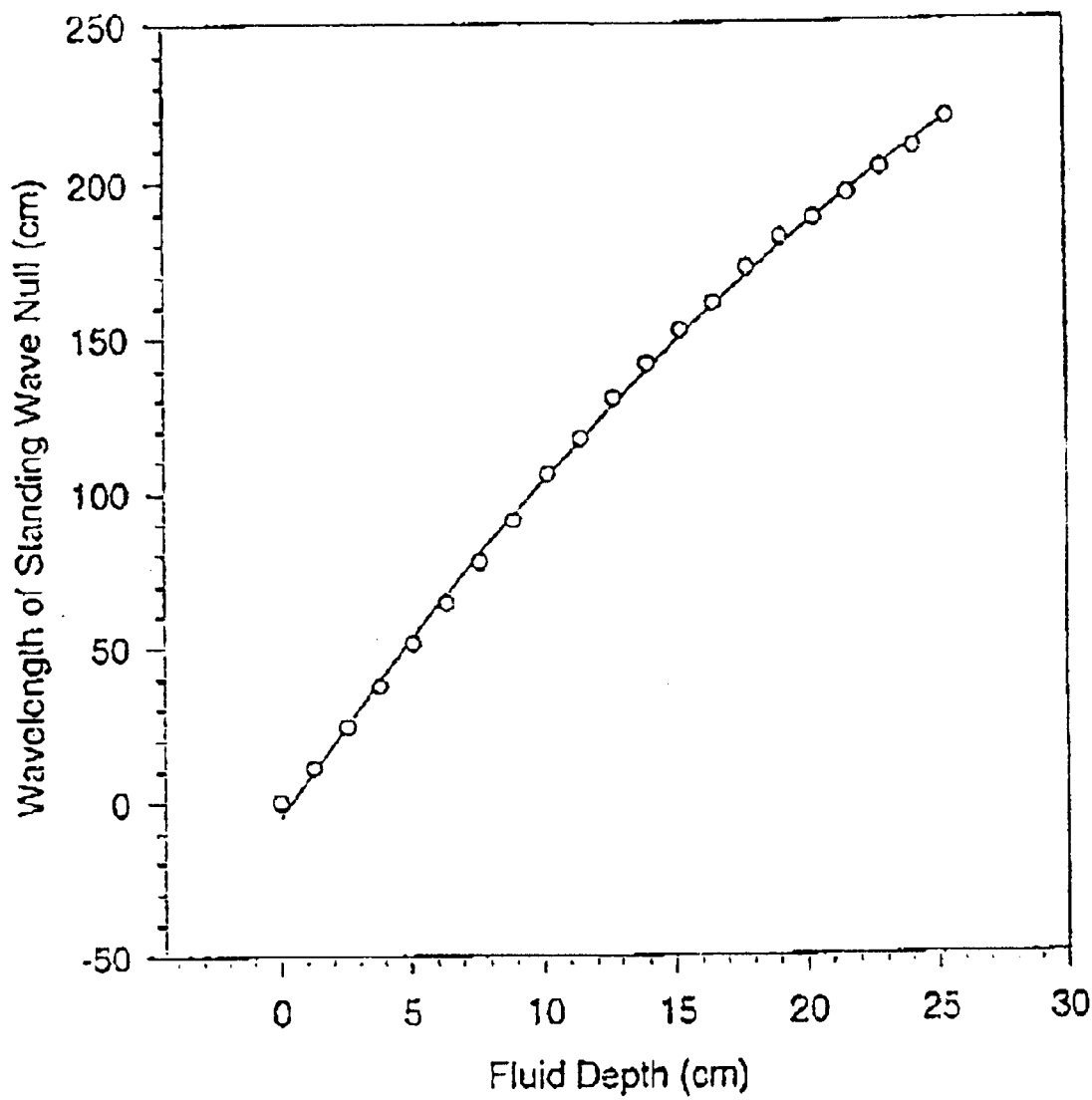
FIG. 11 is a graph of the sensitivity of a sensor for measuring the fluid level of pump oil.

FIG. 10 and FIG. 11, respectively, show the frequency response and the sensitivity of this embodiment, in which the coaxial sensor is formed with an inductor surrounded by the outer conductor to create a delay line sensor. FIG. 11 shows the sensitivity of the delay line sensor utilizing pump oil for this embodiment. A first node 1001 is clearly visible and easily detectable by an amplifier and detector. The electrical length (half the standing wave wavelength) is 2.2 meters, about five times the physical length. This is a useful sensor for small vessels in the liter volume range. The vertical axis in FIG. 11 is a measure of the electrical length of the sensor.

Figure 12:
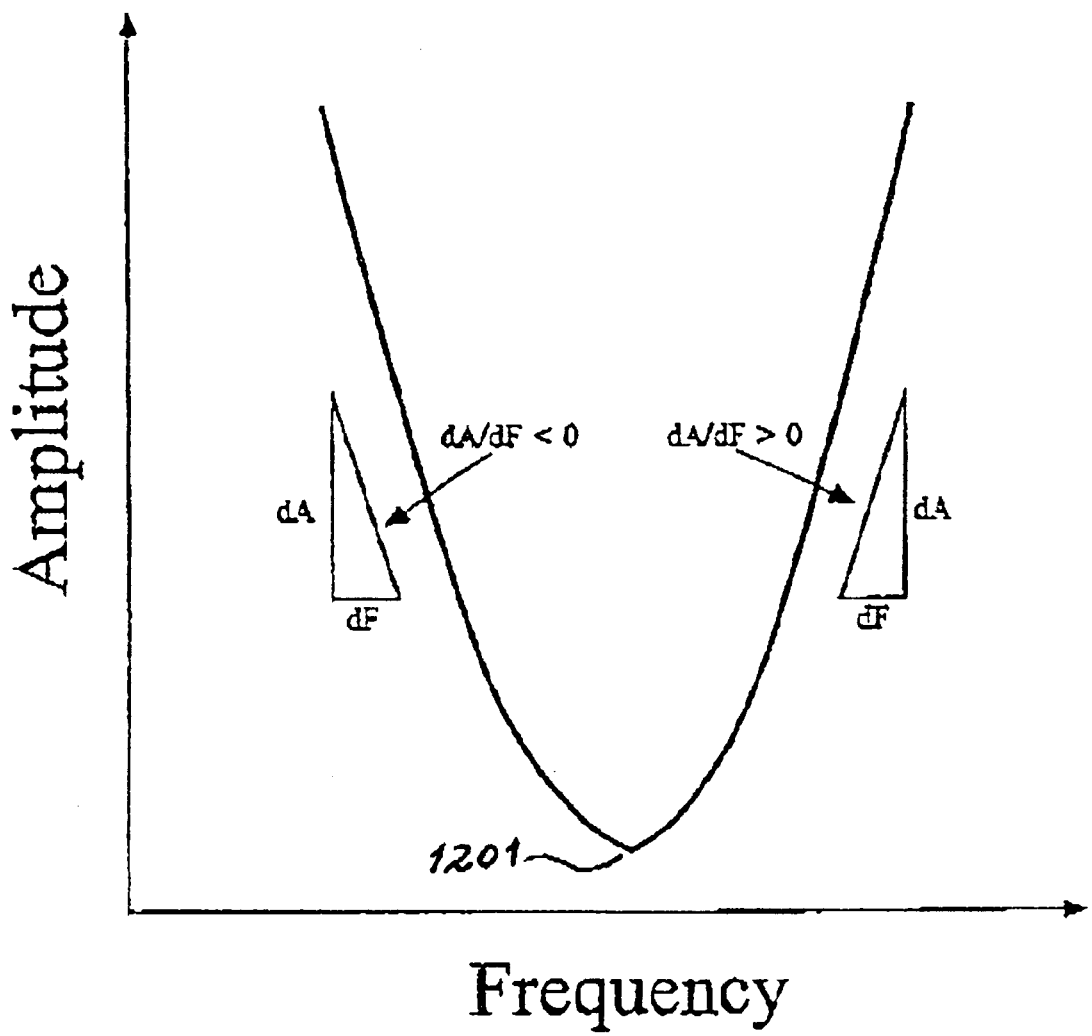
FIG. 12 is a graph depicting the measurement principle for the electronic interface of the sensor according to an embodiment of the present invention.

FIG. 12 illustrates a measurement principle according to the preferred embodiment of the present invention. The first standing wave node 1201 is used for measurement calculations. As a general overview, a sine wave is injected into the sensing element. The lock-in amplifier detects the first node 1201, calculates the derivative of the RF amplitude, and adjusts the frequency of the sine wave of the frequency synthesizer until the calculated derivative equals zero, thus calibrating the system. As the fluid in the coaxial sensor changes, the amplitude of the standing wave is measured at the resistor "T" network and translated into a fluid level via a look-up table or algorithm stored in a system memory. Further explanation will be discussed with reference to FIG. 13.

Figure 13:
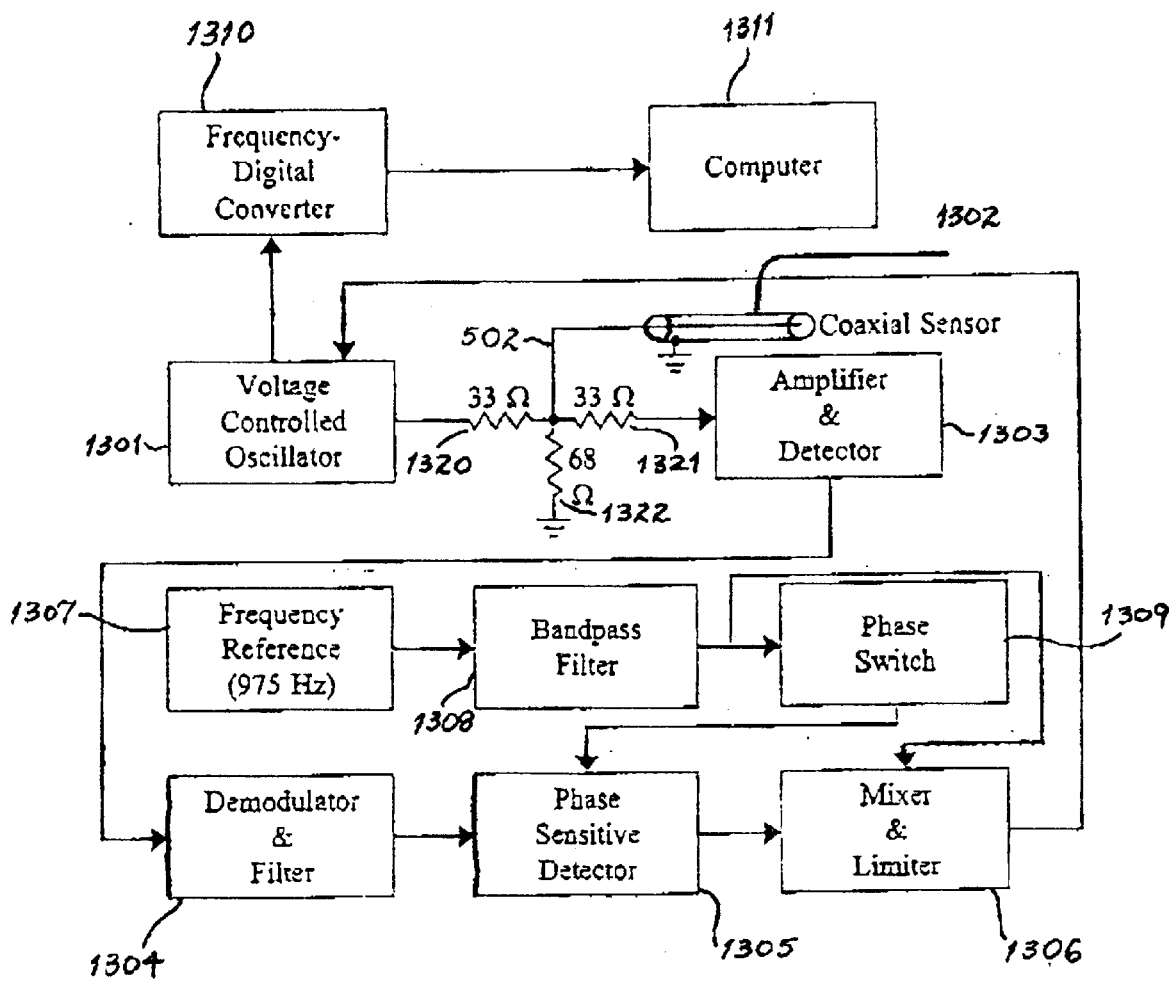
FIG. 13 is a block diagram of the electronic interface according to an embodiment of the present invention.
Figure 14A:
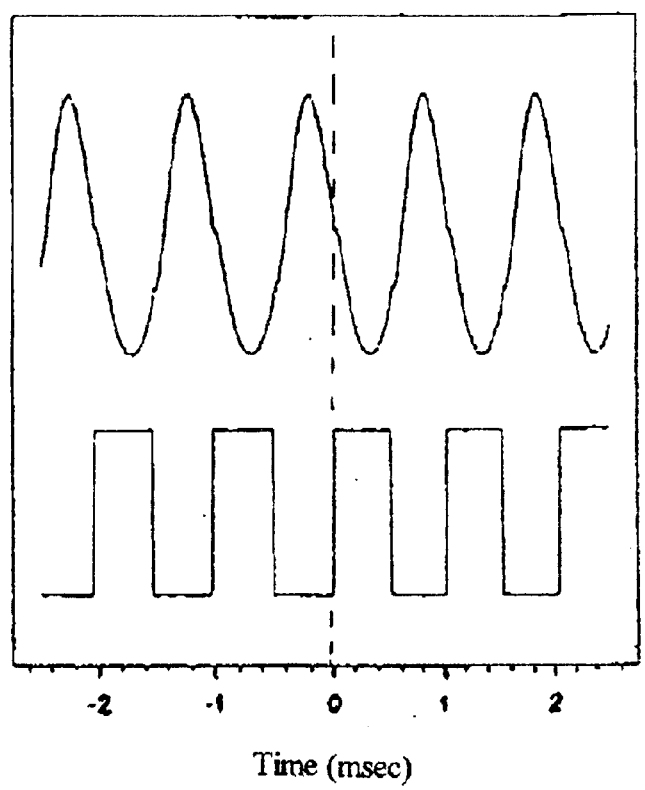
FIGS. 14A and 14B illustrate input signals requiring calibration.
Figure 14B:
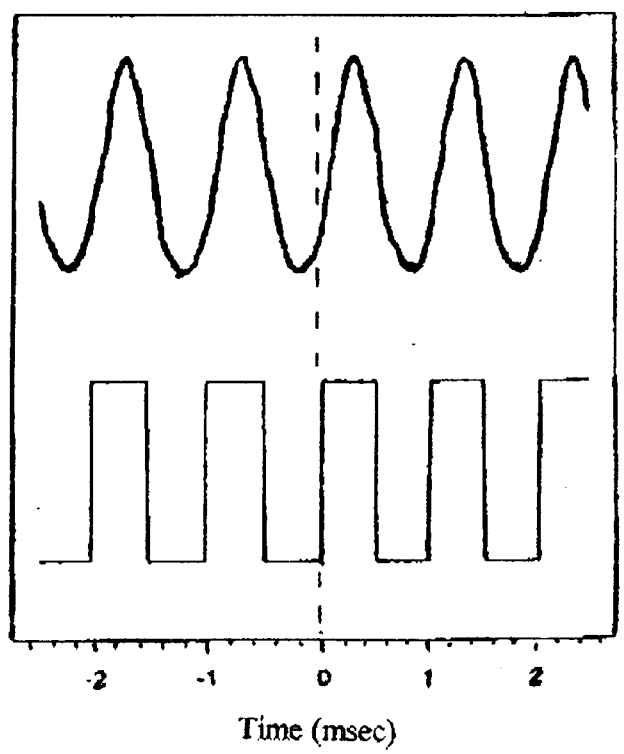

FIG. 13 is a block diagram of the preferred embodiment of the present invention. The operation of the invention will be described in conjunction with FIG. 13. The frequency synthesizer 503 of FIG. 5 has been replaced by a voltage-controlled oscillator (VCO) 1301. The VCO produces a sine wave signal that is injected into the coaxial sensor 1302 through the coaxial cable. This signal, upon reaching the end of the coaxial sensor 1302, whether that end is the physical end of the cable itself or an end created by the level of the fluid, reflects back to produce a reflected signal. The injected signal and the reflected signal are summed by the resistor "T" network (comprised of resistors 1320, 1321, and 1322) and forwarded to the amplifier-detector 1303. The amplifier-detector 1303 receives the signal, amplifies it and demodulates it from the RF component, to produce a signal to be analyzed by the remaining circuitry. A frequency reference 1307 produces a square wave, which is processed by a bandpass filter 1308 to produce a clean sine wave. This modulated sine wave is also processed by a phase switch 1309 to produce a control signal for a phase sensitive detector 1305. The phase-sensitive detector 1305 and control loop produces a small frequency modulating voltage to control the VCO 1301. The detected signal output from the amplifier-detector 1303 is filtered at demodulator and filter 1304 and fed into the phase sensitive detector 1305, which is controlled by the phase switch control signal produced by phase switch 1309. After mixing and filtering at mixer and limiter 1306, the amplitude of the signal is synchronously detected to produce a signal proportional to the frequency derivative of the signal. If the oscillator frequency is on the low side of a node in the amplitude-frequency spectrum, the phase sensitive detector 1305 produces a signal that increases the frequency of VCO 1301 to bring it into the node. Likewise, if the oscillator frequency is on the high side of a node in the amplitude-frequency spectrum, the phase detector 1305 produces a signal that decreases the frequency of VCO 1301 to bring it into the node. This control loop acts to force the VCO 1301 to track the node. FIGS. 14A and 14B illustrate input signals requiring calibration.

FIG. 14A shows the phase relationship of the signal from detector 1305 and control signal of phase switch 1309 at a frequency that is less than the node frequency, and FIG. 14B shows the same signals when the frequency is greater than the node frequency. The node frequency is a function of the overall length of the sensor and cable, and is the frequency adjusted for the minimum amplitude during a no-load state.

Figure 15:
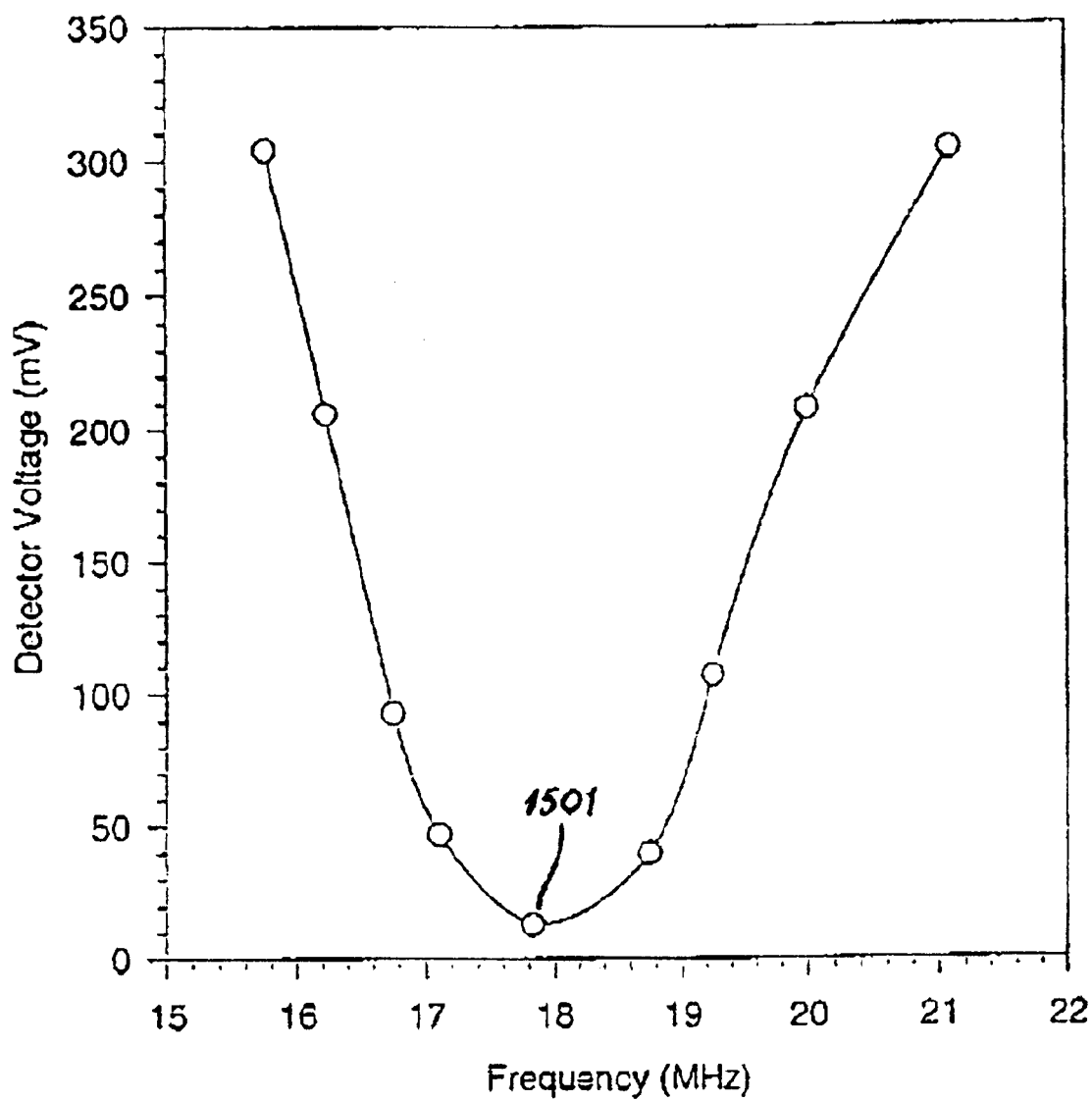
FIG. 15 is a graph of a change in the detector voltage about the node frequency for a 36-inch fluid level sensor.

In the case depicted in FIG. 14A, the phase relationship will cause a voltage to be added to the control loop of the VCO 1301 to increase the frequency to bring it back into the node. Likewise, in the case depicted in FIG. 14B, the phase relationship will cause a voltage to be subtracted from the control loop of the VCO 1301 to decrease the frequency to bring it back into the node. FIG. 15 shows the actual change in the detector voltage about the node 1501 for the 36-inch fluid level sensor.

Referring back to FIG. 13, after calibration is complete, the frequency of the VCO 1301 (which is the frequency of the node) is digitized at converter 1310 and sent to a computer 1311. The frequency-digital converter 1310 is preferably a simple analog-to-digital (A/D) converter. This frequency is a function of the fluid level in the coaxial sensor, and a look-up table or algorithm is utilized to determine the level of the fluid.

The circuit implementation described above uses signal generation, and adjusting and detection circuitry to accomplish the desired result, but is not meant to be exclusive as the only method of generating, adjusting and detecting the signals. As shown in FIG. 13, the computer 1311 can be used to interface to the present invention. A program accepts the data through a parallel port, processes the data and produces a fluid level value. The program can also incorporate a data-logging feature.

Figure 16:
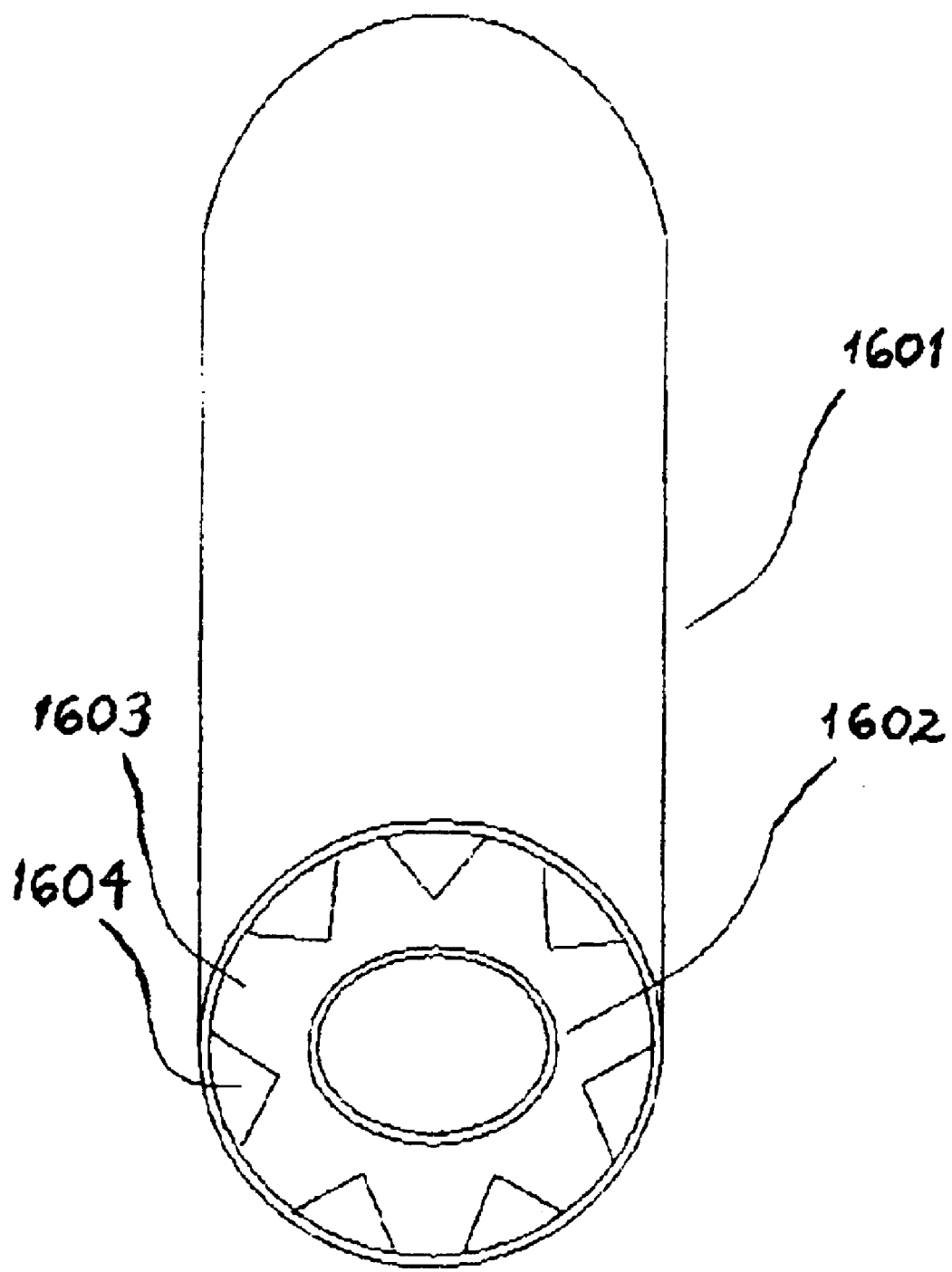
FIG. 16 is a perspective view of the open end of the fluid level sensor according to a further embodiment of the present invention.

There are three factors that require system compensation and will now be described as further embodiments of the present invention. First, temperature changes in the fluid during measurement will affect the accuracy of the system. To compensate for this fluid property, a thermometer can be used to measure temperature variations that can be processed by the computer to compensate therefore. As an alternative, a second sensing element can be added to the overall system and filled with the same fluid being measured, where the second sensing element acts as a reference to detect and store changes in fluid properties during normal operations. This reference data is processed by the computer and incorporated into the final level calculations. Second, fluid level measurement errors can be generated by excess fluid adhering to the sides of the inner and outer tubes. To reduce these errors, a Teflon® coating to the tubes prevents adherence and improves overall accuracy. Finally, level measurement errors generated by a sloshing effect caused by movement of the fluid can be detected. FIG. 16 is a diagram of an open end of a fluid level sensor according to a further embodiment of the present invention showing the outer conductor 1601 and the inner conductor 1602. To correct for this sloshing effect an end plug 1603 with a few small entry holes 1604 will eliminate error from sloshing, since it limits the rates of inflow and outflow of the sensor. A small hole (not shown) is also needed at the top of the sensor for outflow of air.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. An apparatus for detecting the level of a fluid and comprising:
   a radio frequency transmission line comprising an inner conductor and an outer conductor proximate to said inner conductor and providing a return current path, wherein the outer conductor is spaced from the inner conductor by insulating spacers to provide a characteristic impedance;
   generating means connected to the inner conductor for injecting an injected wave into the transmission line;
   summing means for creating a standing wave which is the sum of the injected wave and a reflected wave reflected by the end of the transmission line, said summing means being connected between the generating means and the transmission line;
   a detector for detecting the voltage and phase of the standing wave;
   means for adjusting the frequency of the generating means in response to the voltage and phase of the standing wave; and
   means for comparing the adjusted frequency with reference data for determining the level of the fluid between the inner and outer conductors.

2. The apparatus of claim 1 wherein the transmission line is a coaxial sensor and the inner conductor is a first cylinder and the outer conductor is a second cylinder encompassing the first cylinder.

3. The apparatus of claim 2 wherein at least the outer surface of the first cylinder and the inner surface of the second cylinder are Teflon coated.

4. The apparatus of claim 2 further including an end plug having small entry holes therein positioned between the first and second cylinders.

5. The apparatus of claim 2 further comprising a glass tube between the first and second cylinders.

6. The apparatus of claim 1, wherein the summing means is a "T" network including:
   a first resistor connected to the output of a variable frequency oscillator;
   a second resistor connected to an amplifier/detector; and
   a third resistor connected to a system ground, and wherein each resistor is connected to the transmission line.

7. The apparatus of claim 6 wherein each resistor is connected to the transmission line through an intermediate coaxial cable.

8. The apparatus of claim 6, wherein the impedance measured with respect to ground at any junction of the "T" network is between 50 and 300 ohms.

9. An apparatus for detecting the level of a fluid and comprising:
   a coaxial sensor defining a radio frequency transmission line and including an inner conductor and an outer conductor encompassing the inner conductor and providing a return current path, said outer conductor being spaced from said inner conductor by insulating spacers to provide a characteristic impedance and the fluid whose level is to be measured being placed between said inner and said outer conductors;
   generating means connected to the inner conductor for injecting an injected wave into the transmission line;
   summing means for creating a standing wave which is the sum of the injected wave and a reflected wave reflected from the end of the transmission line, said summing means being connected between the generating means and the transmission line;
   a detector for detecting the voltage and phase of the standing wave; and
   means for comparing the detected voltage and phase with reference data for determining the level of the fluid in the coaxial sensor.

10. An apparatus for detecting a fluid level and comprising
    a coaxial sensor comprising an inner conductor and an outer conductor encompassing said inner conductor, the fluid whose level is to be detected being between said inner and said outer conductors;

means for injecting a radio frequency wave into said coaxial sensor;

means for summing said injected wave and a reflected wave reflected from the end of the coaxial sensor, said summing means being electrically connected to said coaxial sensor;

means for adjusting the frequency of the injected wave in response to a voltage and phase of the summed injected and reflected waves; and mean for processing the frequency and based thereon displaying a representation of the fluid level.

11. The apparatus of claim 10 wherein said injecting means and said summing means are connected to said coaxial sensor through an intermediate coaxial cable.

12. The apparatus of claim 10 wherein said inner and outer conductors comprise a first and a second electrically conductive tube respectively, the first tube being positioned within the second tube and secured by at least one insulator, wherein an inside diameter of the second tube is greater than an outside diameter of the first tube.

13. The apparatus of claim 12 wherein the first tube is equal in length to the second tube.

14. An apparatus for detecting a fluid level and comprising:

a coaxial radio frequency transmission line sensor in which is the fluid whose level is to be detected;

means for injecting a radio wave of a fixed frequency into said coaxial transmission line sensor;

means for summing said injected wave and a reflected wave reflected from the end of said of said coaxial radio frequency transmission line sensor, said summing means being electrically connected to said coaxial radio frequency transmission line sensor;

means for detecting the voltage and phase of the result of the summing of the injected wave and the reflected wave; and means for comparing the detected voltage and phase with reference data for determining the level of the fluid.

15. The apparatus of claim 14, wherein the coaxial radio frequency transmission line sensor comprises a first electrically conductive tube and a second electrically conductive tube positioned within the first tube and secured by at least one insulator, wherein an inside diameter of the first tube is greater than an outside diameter of the second tube and the fluid whose level is to be detected is between said first and second tubes.

16. An apparatus for detecting a fluid level and comprising:

a radio frequency transmission line comprising an inner conductor and an outer conductor providing a return path and spaced from the inner conductor by insulating spacers to provide a characteristic impedance, the fluid whose level is to be detected being between the inner and outer conductors;

a source for generating and injecting an injected wave into the radio frequency transmission line;

summing means for summing the injected wave and a reflected wave, said summing means being connected between the source and the transmission line;

an amplifier connected to the transmission line for amplifying the sum of the injected weave and the reflected wave;

an analog-to-digital converter connected to the output of the amplifier; and a computer connected to the analog-to-digital converter for processing the digital data received from the analog-to-digital converter.

17. The apparatus of claim 16, wherein said source is a variable frequency oscillator.

18. The apparatus of claim 16, wherein said source is a constant frequency oscillator.

19. The apparatus of claim 16, wherein the summing means comprises a resistor network for measuring a voltage difference representing a relative change in the position of the fluid level between the inner and outer conductors.

20. A method for detecting the level of a fluid, said method comprising the steps of:

locating the fluid between the inner and outer conductors of a radio frequency transmission line;

introducing a radio frequency voltage into the transmission line;

detecting a voltage that is a sum of the introduced radio frequency voltage and a reflected wave voltage reflected by the end of the transmission line; and determining the level of the fluid by comparing the summed voltage with stored fluid level reference data.

21. The method according to claim 20, wherein introduced radio frequency voltage has a constant frequency.

22. The method according to claim 20, further comprising the steps of adjusting the frequency of the injected wave voltage to determine at least one relative minimum or maximum voltage; and determining the level of the fluid by comparing the frequency of the detected relative minimum or relative maximum voltage with stored fluid level reference data.

23. An apparatus for detecting the level of a fluid, said apparatus comprising:

a coaxial sensor having a first tube constructed of electrically conductive material having an inside diameter and a second tube constructed of electrically conductive material having an outside diameter, said outside diameter of the second tube being less than said inside diameter of the first tube, wherein said second tube is affixed to said first tube by insulating spacers;

a coaxial cable connected at a first end thereof to said second tube;

generating means connected to a second end of said coaxial cable for introducing an injected wave into the coaxial cable;

means for summing the injected wave and a reflected wave, said summing means being connected to the second end of the coaxial cable;

a voltage detector for detecting a voltage of the summed injected wave and reflected wave; and means for comparing the detected voltage with reference data for determining the level of the fluid.

24. The apparatus of claim 23 wherein said reflected wave is reflected from the end of said coaxial sensor and the fluid whose level is to be detected is between said first and said second tubes of said coaxial sensor.

25. The apparatus of claim 23, wherein the summing means is a "T" network including:

a first resistor connected to the output of a variable frequency oscillator;

a second resistor connected to an amplifier/detector; and a third resistor connected to a system ground, and wherein each resistor is connected to the second end of said coaxial cable.

26. The apparatus of claim 23, wherein an impedance of said coaxial cable is equal to an impedance of said coaxial sensor.

27. The apparatus of claim 26, wherein the impedance of the coaxial sensor is determined by the equation $$Z = 138 \log_{10}(b/a)$$

wherein "b" is the inner diameter of the first tube and "a" is the outer diameter of the second tube.

* * * * *